United States Patent [19]

Wenninger

[11] 4,061,054
[45] Dec. 6, 1977

[54] STEERING WHEEL

[75] Inventor: Josef Wenninger, Vorsfelde, Germany

[73] Assignee: Volkswagenwerk Aktiengesellschaft, Germany

[21] Appl. No.: 704,095

[22] Filed: July 9, 1976

[30] Foreign Application Priority Data

July 9, 1975 Germany .............................. 2530594

[51] Int. Cl.² .......................... G05G 1/10; B62D 1/18
[52] U.S. Cl. .................................... 74/552; 188/1 C
[58] Field of Search ........................ 74/492, 493, 552; 188/1 C

[56] References Cited

U.S. PATENT DOCUMENTS

| 3,528,530 | 9/1970 | Franck et al. | 74/492 X |
| 3,586,131 | 6/1971 | LeMire | 188/1 C |
| 3,714,844 | 2/1973 | Tsuda | 74/552 |
| 3,901,091 | 8/1975 | Wenninger | 74/552 |

Primary Examiner—Allan D. Herrmann
Attorney, Agent, or Firm—Brumbaugh, Graves, Donohue & Raymond

[57] ABSTRACT

A steering wheel is designed to be attached to a steering column by means of a deformation member to enable the steering wheel to tilt with respect to the axis of the steering column upon impact by the driver. The deformation member is a flat plate with lines of reduced strength preferably in the form of spirals extending from the center of the hub.

8 Claims, 4 Drawing Figures

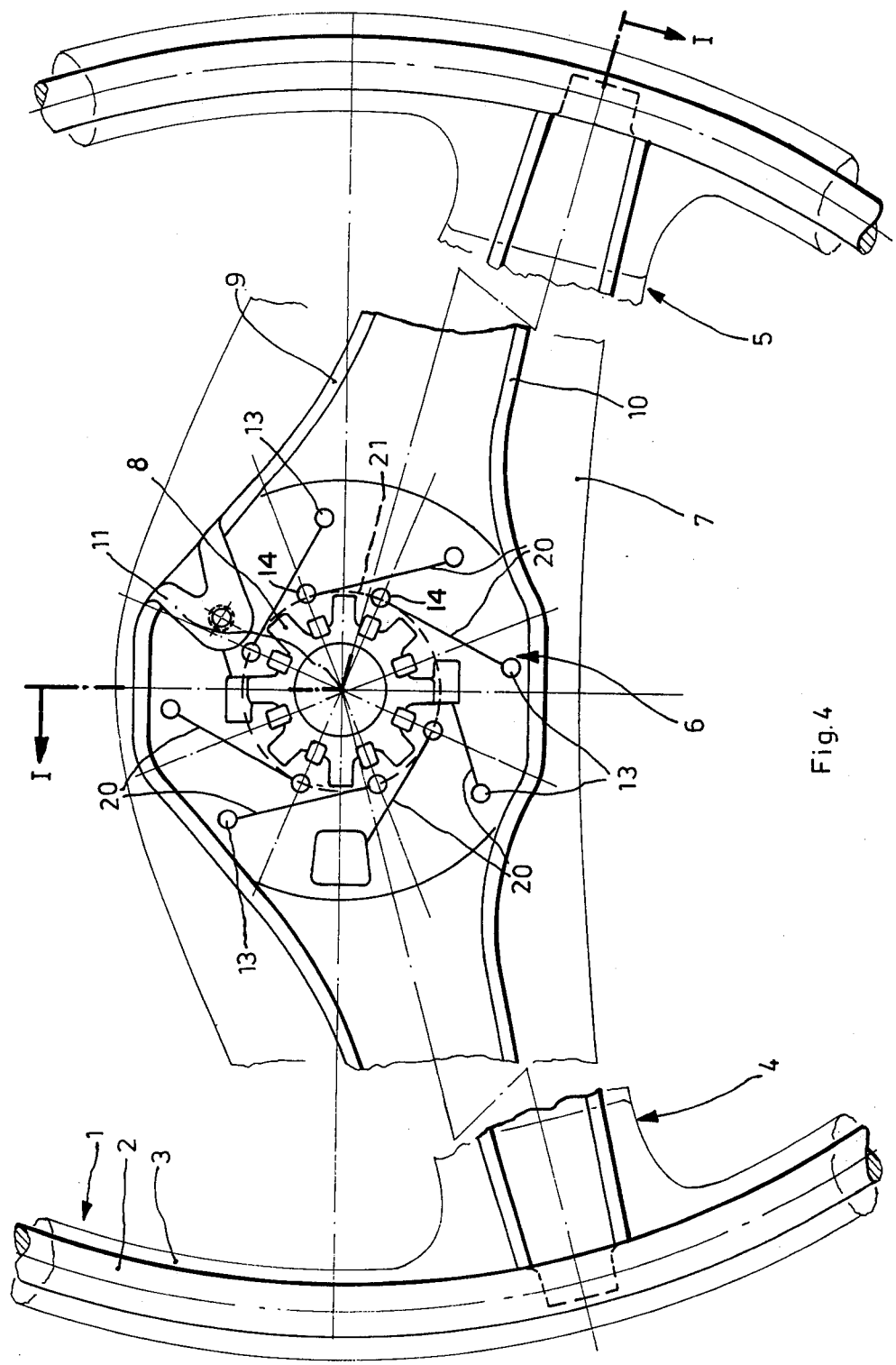

STEERING WHEEL

BACKGROUND OF THE INVENTION

The present invention relates to steering wheels and in particular to steering wheels which include devices which enable tilting of the steering wheel upon impact of the driver's body in the event of a collision.

It is well known to provide a steering wheel and steering column with an impact energy absorbing deformation member, which absorbs the energy of impact forces by the driver's body in the direction of the axis of the steering column. In conjunction with such deformation members it is also desirable to provide the steering wheel itself with a member which permits the steering wheel to tilt with respect to the axis of the steering column, in order that the angle of the steering wheel plane may conform to the angle of the driver's body, to provide the maximum possible impact area, thereby minimizing the forces on any particular portion of the driver's body.

Prior art deformation members have been known which provide both impact energy absorption for forces along the axis of the steering column and a tilting action of the steering wheel to permit conformance with the angle of the impacting body. One such prior art deformation member is in the form of a pot disposed between the steering wheel hub, which is connected to the steering column, and the steering wheel spokes. Such a pot-shaped member provides deformation and energy absorption along the column axis and also permits tilting of the steering wheel with respect to the column. One problem with such prior art deformation members is that the presence of the pot-shaped element makes it difficult to arrange vehicle controls on the steering column.

Another prior art deformation member which provides for energy absorption of axial forces and enables tilting of the steering wheel is described in published German patent application 2,063,763. That application describes a disk-shaped corrugated sheet, disposed between the steering wheel spokes and the steering wheel hub. Upon impact the disk expands along its axis to absorb impact energy and deforms to permit tilting of the steering wheel. A similar disk-shaped member is described in U.S. Pat. No. 3,586,131. Such deformation members, while requiring less space on the steering column than the pot-shaped members, do require that there be a provision for space into which the member may expand upon deformation.

The present invention is based upon the realization that it is not necessary to provide for absorption of axial force energy and steering wheel tilt by the same deformation member. In accordance with the present invention absorption of axial forces on the steering column is provided by auxiliary energy absorbing members, such as described in German published patent application 1,935,746. Tilting of the steering wheel can therefore be effected by a member which does not also have to absorb axial steering column forces and may therefore be designed to make more efficient use of space on the steering column.

It is therefore an object of the present invention to provide a steering wheel capable of tilting upon impact by a vehicle operator.

It is a further object of the present invention to provide such a steering wheel wherein the deformable member takes up a minimal amount of space on the steering column.

SUMMARY OF THE INVENTION

In accordance with the present invention there is provided a steering wheel including a hub having an axis, a rim, spokes interconnecting the hub with the rim and deformation member interposed between the spokes and the hub. The deformation member is designed to allow the steering wheel to tilt upon impact by a vehicle operator. The member is in the form of a flat plate with lines of reduced strength. Each of the lines interconnects a pair of selected end points at different radial distances and different angles from the axis.

In a preferred embodiment the lines of reduced strength may be either straight lines or arcs which are rotationally symmetrical about the axis and extend between holes in the plate. The deformation member may be formed on a piece of sheet metal which also forms the steering wheel spokes. The sheet metal may be bent in the region of its edges and around the deformation member for increased strength. The lines of reduced strength may be formed by a punching operation.

For a better understanding of the present invention together with other and further objects thereof, reference is made to the following description, taken in conjunction with the accompanying drawings, and its scope will be pointed out in the appended claims.

BRIEF DESCRIPTION OF THE DRAWINGS

FIG. 4 shows another embodiment of the invention.

DESCRIPTION OF THE INVENTION

Figure 1:
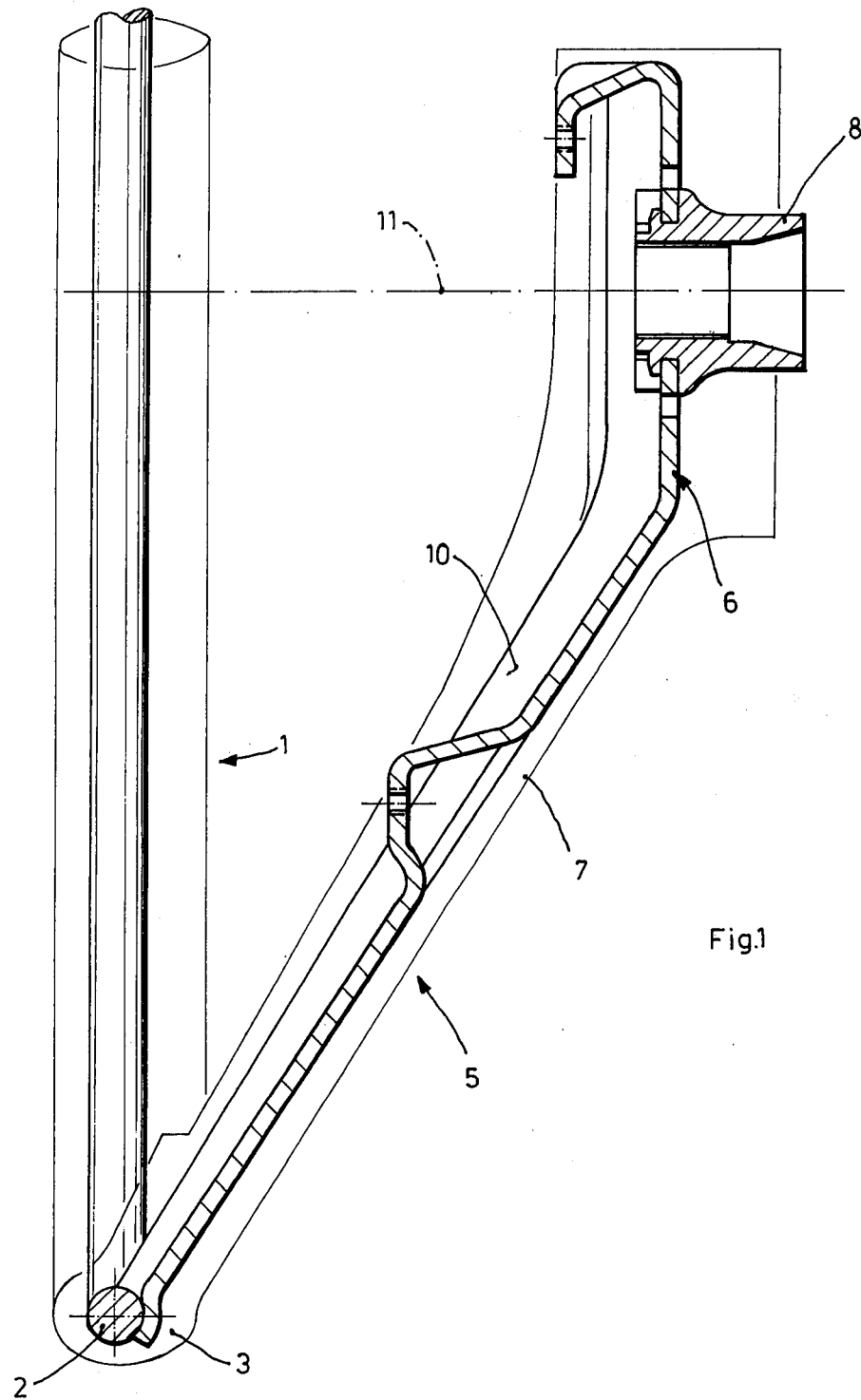
FIG. 1 is a cross sectional view of a steering wheel having a deformation member in accordance with the present invention.
Figure 2:
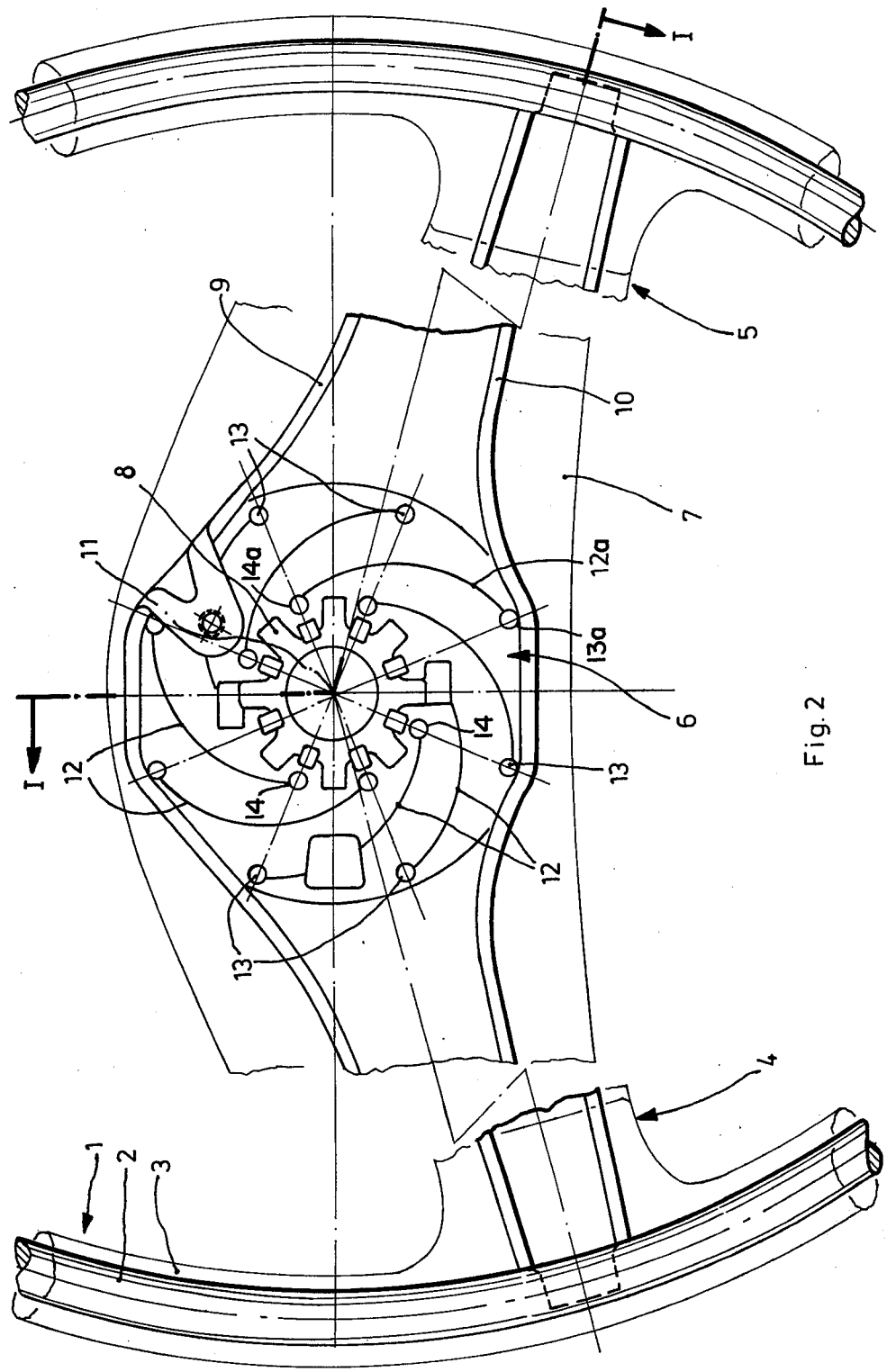
FIG. 2 is a plane view of the steering wheel of FIG. 1 showing the details of the deformation member of the present invention.

Referring generally to FIGS. 1 and 2 a steering wheel is provided with a rim 1 having a metallic core 2 and covered by a plastic sheathing 3. Spokes 4 and 5 connect the steering wheel rim with hub 8 by which the steering wheel is connected to a steering column. The axis 11 of the steering column is usually perpendicular to a plane formed by the rim 1 of the steering wheel. The spokes 4 and 5 are provided with a plastic coating 7. The steering wheel spokes 4 and 5 and a central deformation member 6 are formed out of a single piece of sheet metal. The edges of the sheet metal 9 and 10 are bent to provide increased rigidity to the spokes and the deformation member 6. Deformation member 6 comprises the portion of the sheet metal piece surrounding hub 8 and includes a plurality of lines 12 of reduced strength arranged on all sides of the hub. Lines 12 extend between holes 13 and 14 in the sheet metal and are preferably located in a rotationally symmetrical arrangement around axis 11 of the steering column. Each of lines 12 interconnect two points 13 and 14 which are at different radial distances from the hub axis and at different angles with respect to the hub axis. For example line 12a connects end point 13a and end point 14a. End point 13a is about twice as far from axis 11 as end point 14a and is located at a different angle, approximately 90° from end point 14a. In the embodiment illustrated in FIG. 2 lines 12 are in the form of spiral arcs extending between holes 13. These lines may also be in the shape of straight lines interconnecting similarly located holes as shown by lines 20 in FIG. 4. In this case all of the lines 20 will be tangent to a common circle 21 about axis 11.

It may readily be seen that the deformation member of the present invention may be constructed as an integral part of the steering wheel and spoke assembly, without consuming any substantial space on the steering wheel or steering column or interfering with the placement of controls on the steering column.

The lines 12 are preferably formed in the sheet metal plate by a punching operation wherein the lines are first cut and then by subsequent punching the opposite edges are brought into force transmitting contact. In this way the steering wheel is rigidly connected to the hub for transmission of steering forces prior to the occurrence of a collision and impact by the driver's body. In contrast prior art pot-shaped deformation members, such as described in German patent application 2,227,331 provide a weakening of the connection between the steering wheel and steering column even prior to the occurrence of a collision.

Figure 3:
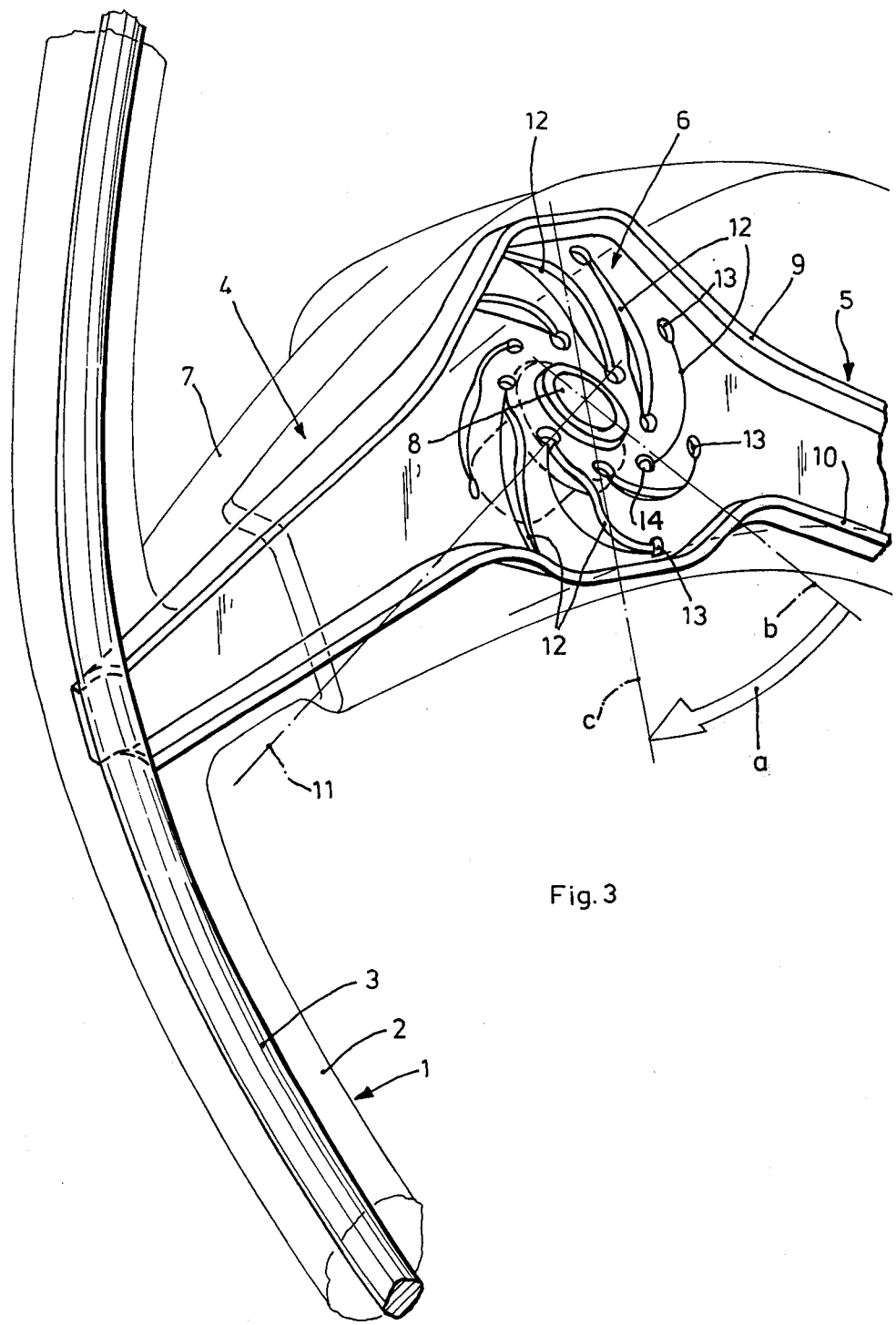
FIG. 3 is a perspective view of the steering wheel of FIGS. 1 and 2 illustrating the manner in which the deformation member operates to effectuate steering wheel tilt.

Upon the occurrence of a collision and impact by the driver's body with the steering wheel of the present invention an uncoiling process takes place whereby the lines of reduced strength are separated from each other to provide open gaps and permit the steering wheel rim to be tilted out of its normal position and conform with the angle of the impacting body. Such a tilting with respect to the axis of the steering column is illustrated by the angle "a", illustrated in FIG. 3, which is between the original plane of the steering wheel "b" and the resulting plane of the steering wheel "c".

The deformation member of the present invention provides only for the tilting movement of the steering wheel and other measures must be taken to provide for absorption of the energy associated with impact forces along the steering wheel column. Another feature of the present invention is that the steering wheel may be tilted in any direction in accordance with the steering position of the wheel and the angle of impact of the driver's body.

The embodiment shown in FIG. 4 differs from that of FIG. 2 only insofar as the lines of reduced strength comprise straight lines 20 tangent to a common circle 21 around axis 11.

While there has been described what is believed to be the preferred embodiments of the present invention, those skilled in the art will recognize that other and further modifications may be had thereto without departing from the true spirit of the invention, and it is intended to cover all such embodiments which fall within the true scope of the invention.

I claim:

1. A steering wheel comprising a hub having an axis, a rim, spokes interconnecting said hub with said rim, and a deformation member, interposed between said spokes and said hub and surrounding said hub, for permitting said steering wheel to tilt upon impact by a vehicle operator, said deformation member having the form of a flat plate having a plurality of lines of reduced strength on all sides of said hub, each of said lines interconnecting first and second end points, said first end point for each line being at a different radial distance from said hub axis and at a different angle with respect to said hub axis than said second end point.

2. A steering wheel according to claim 1 wherein said lines of reduced strength comprise straight lines tangent to a common circle around said axis.

3. A steering wheel according to claim 1 wherein said lines of reduced strength comprise arcs.

4. A steering wheel according to claim 1 wherein said lines of reduced strength are disposed in a rotationally symmetrical arrangement around said axis.

5. A steering wheel according to claim 1 wherein said lines of reduced strength are formed by cutting and punching said plate.

6. A steering wheel according to claim 1 wherein said lines of reduced strength end in holes through said plate.

7. A steering wheel according to claim 1 wherein said spokes and said deformation member are formed out of the same piece of sheet metal.

8. A steering wheel according to claim 7 wherein said piece of sheet metal is provided with bent edges extending along said spokes and around said deformation member.

* * * * *